United States Patent [19]

Harriett

[11] Patent Number: 4,696,699
[45] Date of Patent: * Sep. 29, 1987

[54] FLEXIBLE GROUT COMPOSITION AND METHOD

[75] Inventor: Todd D. Harriett, Elk Grove Village, Ill.

[73] Assignee: American Colloid Company, Arlington Heights, Ill.

[*] Notice: The portion of the term of this patent subsequent to Sep. 29, 2004 has been disclaimed.

[21] Appl. No.: 849,048

[22] Filed: Apr. 7, 1986

Related U.S. Application Data

[63] Continuation-in-part of Ser. No. 787,505, Oct. 15, 1985, abandoned.

[51] Int. Cl.$^4$ .............................................. C04B 12/04
[52] U.S. Cl. .................................... 106/74; 106/84; 405/267
[58] Field of Search ..................... 106/74, 84; 405/267

[56] References Cited

U.S. PATENT DOCUMENTS

| | | | |
|---|---|---|---|
| 2,198,120 | 4/1940 | Lerch et al. | 106/84 |
| 4,018,616 | 4/1977 | Sugahara et al. | 106/74 |
| 4,083,407 | 4/1978 | Griffin et al. | 106/81 |
| 4,102,400 | 7/1978 | Crinkelmeyer et al. | 166/283 |
| 4,378,249 | 3/1983 | Beale et al. | 106/74 |

FOREIGN PATENT DOCUMENTS

| | | | |
|---|---|---|---|
| 963236 | 7/1964 | United Kingdom | 106/84 |
| 973829 | 10/1964 | United Kingdom | 106/84 |

*Primary Examiner*—William R. Dixon, Jr.
*Assistant Examiner*—Steven Capella
*Attorney, Agent, or Firm*—Mason, Kolehmainen, Rathburn & Wyss

[57] ABSTRACT

A flexible grout composition is used to cement a conduit within a bore hole to prevent fluid loss, for sealing and grouting well casings, plugging abandoned wells, and waterproofing earthen structures. The flexible grout composition includes a water-swellable clay, such as bentonite; a particulate filler, such as calcium bentonite; a water soluble silicate; a source of multivalent metal cations; and a gelling agent for the water-swellable clay, particularly an inorganic gelling agent such as magnesium oxide or sodium carbonate (soda ash). The grout composition is mixed with water to form a slurry and the slurry is pumped into its intended location, for example, within the annulus defined between an outer surface of a conduit or casing disposed within a bore hole, and the surrounding earthen formation formed, for example, by drilling.

23 Claims, No Drawings

FLEXIBLE GROUT COMPOSITION AND METHOD

CROSS REFERENCE TO RELATED APPLICATION

This application is a continuation-in-part of my co-pending application Ser. No. 787,505 filed Oct. 15, 1985.

FIELD OF THE INVENTION

The present invention is directed to a settable grout composition particularly useful in the well and geotechnical industries for sealing and grouting well casings, plugging abandoned wells, and water-proofing earthen structures. More particularly, the present invention is directed to a grout composition mixable with water to form a thixotropic cement slurry particularly useful in cementing conduit into mine shafts, water wells, oil wells, waste-disposal wells, steam producing wells, thermal recovery wells and other types of wells, particularly in perma-frost environments. The conduit is cemented in place by filling the slurry into an annular space between the outer surface of the conduit and the surrounding earthen formation to prevent fluid loss from the well.

BACKGROUND OF THE INVENTION AND PRIOR ART

Thixotropic cement slurries have been used for many years in cementing conduits into drilled bore holes to prevent fluid loss from the well to the surrounding earthen formation. The prior art suggests a number of compositions mixable with water to form a slurry capable of reducing the fluid loss to the surrounding formation or capable of providing a hardened cement to permanently set the conduit into position without fluid loss. Among these prior art compositions, it is known to use bentonite clay in pellet or slurry form to prevent fluid loss and it is known to use a mixture of bentonite clay with Portland cement settable to a hard condition for permanently fixing the conduit within the bore hole. The following patents disclose various soil sealing compositions:

Mason U.S. Pat. No. 4,463,808 discloses a well fluid and bore hole sealing composition including water, a water-swellable clay and a water dispersible polymer, such as an emulsion polymerized hydrolyzed polyacrylamide to prevent the immediate hydration of the clay.

Pazawa et al U.S. Pat. No. 4,004,428 is directed to a process for stabilizing soil by injecting into the soil a grout mixture comprising an aqueous sodium silicate solution, an aqueous solution of a gelling agent consisting of chlorides, sulfates and nitrates of aluminum, magnesium and iron and then gelling the injected mixture in the soil by adding at least one oxy acid.

The Kim et al U.S. Pat. No. 3,615,780 is directed to the gelling of an aqueous solution of vegetable polyphenolic material derived from coniferous tree bark or tannins of catechin or condensed type by reaction with alkali metal silicates, preferably sodium or potassium silicate. The compositions may be modified with additional material such as bentonite clay, Portland cement and the like.

The Chesney, Jr. et al U.S. Pat. No. 4,447,267 is directed to a Portland cement based grout composition including bentonite clay, a filler and a composite of a cellulose ether and a long chain polymer, such as polyacrylamide.

Crinkelmeyer et al U.S. Pat. No. 4,102,400 is directed to a composition for contacting a well bore prior to disposing a thixotropic cement slurry in the well bore to initially prepare the well bore to prevent fluid loss. The slurry, used prior to the cement, is a gel formed by the reaction of a silicate with a multivalent metal cation; an inert particulate filler and a water-dispersible cellulose compound. This fluid is referred to as a "spacer fluid" since the fluid is frequently used ahead of the cement to displace the drilling mud from the bore hole.

Cementing or grouting of steel well casings in well bores dates back to the early twentieth century. Early uses were directed to filling a cement grout in the well bore annulus surrounding the casing to separate water from oil producing zones and for the completion of water wells. Wells are cased and cemented down to at least a lowest possible pumping level to prevent contamination of the pumped fluid from the surrounding earthen formation. In the case of impervious strata above the oil or water producing gravel or sand, the cement should extend from the surface down to the impervious strata. Further, more and more attention is now given to proper plugging of abandoned wells for the purpose of environmental protection. Cementing or grouting of abandoned wells is an environmentally acceptable procedure. The cement or grout cements the annular space between a hole and a liner or casing, and enters cavities in the surrounding earthen formation to seal the earthen formation against fluids entering the annular space.

The most typical cement compositions used in preventing well bore contamination and for plugging abandoned wells include bentonite clay pellets; neat cement compositions and compositions including both Portland cement and bentonite clay. Bentonite clay pellets, while generally effective in providing a waterimpermeable layer surrounding the well casing, are difficult to position within the well bore annulus surrounding the well casing, particularly in small annular spaces. Bentonite pellets are dropped within the annular space and fall randomly creating various sized void spaces between pellets at different locations. The pellets sometimes become sticky and are difficult to drop within small annular spaces, but, if properly positioned, are effective because of the high concentration of water-swellable bentonite such as sodium bentonite. Generally, although the pellets themselves are essentially 100% bentonite, spacing between pellets creates effectively about a 50% to 60% bentonite concentration within the annular space. The pellets must be positioned in their intended location prior to complete hydration so that, once positioned, the clay can swell to eliminate the void spaces. Consequently, bentonite pellets have a maximum useable depth through water of about 500 feet. The composition of the present invention has no initial void spaces and can displace water in a well annulus to depths of more than 1000 feet.

Water-swellable bentonite clays, when used together with Portland cement, aids in reducing shrinkage of the cement or grout composition but, still, substantial shrinkage occurs, sometimes resulting in undesirable inter-aquifer transfer. Other problems encountered with the above-described prior art cement compositions include a high alkalinity which can alter geotech analyses that rely on accurate pH determination for detection of metal ion contamination; permeability of the cement or grout composition after setting because of the properties of the composition or because of cracking of the cement due to ground shifting; the expense of Portland cement; heating of the cement or grout during curing causing weakening of the well casing, particularly where polymeric casings are used; corrosion of the iron containing well casings because of toxicity of the cement or grout composition, or due to inadequate filling, e.g. shrinkage or cracking of the composition within the annulus, resulting in contamination of the recovered fluid or inadequate well plugging; abrasiveness of the cement or grout on the mixing equipment; initial relatively high viscosity of the composition when mixed with water resulting in more difficulty in completely filling an annulus, with bridging sometimes occurring in the annulus causing inter-zone transfer of fluid and/or contamination; and a non-flexible set cement resulting in cracking upon ground shifting or shrinkage and fluid contamination. The composition of the present invention solves or improves each of the deficiencies in the abovedescribed prior art compositions.

SUMMARY OF THE INVENTION

In brief, the present invention is directed to a flexible grout composition and method of disposing the composition within a bore hole, for example to cement a conduit within the bore hole to prevent fluid loss, for sealing and grouting well casings, plugging abandoned wells, and waterproofing earthen structures. The flexible grout composition includes a water-swellable clay, such as bentonite; a solid particulate filler, particularly an essentially nonswellable bentonite clay, such as calcium bentonite herein defined as a bentonite clay having calcium as the predominant exchangeable cation; a water soluble silicate; a source of multivalent metal cations; and a gelling agent for the water-swellable clay, particularly an inorganic gelling agent such as magnesium oxide or sodium carbonate (soda ash).

The grout composition is mixed with water to form a slurry and the slurry is pumped into its intended location, for example, within the annulus defined between an outer surface of a conduit or casing disposed within a bore hole, and the surrounding earthen formation formed, for example, by drilling.

It should be understood that the composition of the present invention is useful in any environment where it is desirable to protect a structure against liquid contact, and particularly against water contact. Within the first five hours after the solid grout composition of the present invention is mixed with water, the slurry begins to gel, and between five and eight hours after mixing, the viscosity of the slurry reaches a point that it is no longer pumpable. Mixing of the grout compositions can be accomplished with any suitable equipment or method such as a cement mixer, mortar mixer, or by hand, in an amount sufficient to essentially free the slurry from lumps. After about eight hours the composition loses its thixotropy and has an initial set. Between about 8 and 24 hours the composition initially cures and reaches a rigid gel state. Within 24 to 72 hours, the composition reaches its final cure and achieves new and unexpected structural strength for a flexible grouting material.

In accordance with an important feature of the present invention, even after 72 hours or more after mixing, when the composition is completely cured, the grout material of the present invention is flexible, remains moldable, and, if a crack develops in the composition, water contact will cause the composition to expand to self-seal or fill in the crack to make the composition impermeable again. The cured composition is relatively hard having the consistency of a stiff paste, such as a glazing compound or spackling compound, while unexpectedly being more impermeable to water than typical prior art Portland cement-containing compositions.

Accordingly, an object of the present invention is to provide a new and improved water-impermeable, flexible grout material.

Another object of the present invention is to provide a new and improved flexible grout material, containing essentially no Portland cement, and having the properties of essentially no heating or shrinking during curing.

Another object of the present invention is to provide a new and improved composition for cementing a conduit within a bore hole which maintains swellability and moldability after final curing so that the composition has the capability of self-healing if a crack develops, for example by ground movement surrounding the bore hole.

Still another object of the present invention is to provide a new and improved grout composition for filling an annulus between a conduit and a surrounding earthen formation formed by drilling or other excavation process wherein the composition can be pumped into a desired location in the form of a relatively low viscosity slurry for "ease of placement" and, after complete setting, the composition maintains a moldable, swellable consistency such as dense native clay, or other stiff pastes such as spackling compounds or glazing compounds such that if the conduit develops a void or aperture, the composition will fill the void to self-seal the conduit to prevent water flow between the earthen formation and the conduit.

Still other objects of the present invention are to provide a new and improved flexible cement or grout composition having the properties of improved water-impermeability; cost effectiveness; decreased heating and shrinking upon curing; maintenance of flexibility so that the composition has the property of self-healing; the composition is easier to mix and is less abrasive to drilling equipment and other apparatus; the composition has a lower viscosity than prior art cement compositions when initially mixed and maintains this lower viscosity for a longer period of time than prior art cement compositions; the composition is easier to clean from mixing and applicating equipment with water and is more corrosion resistant than prior art compositions; and the composition unexpectedly is more impermeable to water than prior art Portland cement-containing compositions which set to hard, crackable consistencies.

The above and other objects and advantages of the present invention will become more apparent from the following detailed description of the preferred embodiment.

DETAILED DESCRIPTION OF THE PREFERRED EMBODIMENT

The dry grout (prior to admixture with water) of the present invention, for later admixture with water, includes a water-swellable clay, such as bentonite, in an amount of 10 to 80% by weight of the composition; a solid, particulate filler, particularly an essentially nonswellable colloidal clay such as calcium bentonite in an amount of 20 to 80% by weight of the composition; a water soluble silicate in an amount of 0.5-35% by weight; a gelling agent for the water-swellable clay, such as magnesium oxide or sodium carbonate in an amount of 0.5-35% by weight; and a multivalent metal cation source in an amount of 0.5-35% by weight of the composition. Optionally, in order to provide easier mixing of the composition with water, the composition includes a dispersing agent for the water-swellable clay, such as sodium acid pyrophosphate in an amount of 0.5-5% by weight of the composition.

The water-swellable clays useful in the grout compositions of the present invention include any water-swellable colloidal clay which will substantially hydrate in the presence of water, e.g., will swell substantially (greater than 10% by volume) in the presence of water. The water-swellable colloidal clay may be any member of the dioctahedral or trioctahedral smectite group or mixtures thereof. Examples are Beidellite, Nontronite, Hectorite and Saponite. The clay also may be Attapulgite. Generally the water-swellable clay is included in the composition in finely divided form, e.g., 150 to 350 mesh.

To achieve the full advantage of the present invention, complete gelling of the water-swellable clay in the composition is delayed until the composition is disposed in place in contact with an earthen formation or otherwise surrounding a structure to be protected against contact by water by the water-impermeable grout composition. In this manner, the amount of water-swellable clay and other solids, such as the particulate filler, can be substantially increased while providing a pumpable slurry capable of being pumped into its intended location. Premature complete gelling of the water-swellable bentonite portion of the grout composition prior to pumping the composition into its intended location would necessarily limit the solids content of the pumpable composition substantially below that attainable by delayed complete gelling.

One manner of delaying the gelling of the water-swellable clay, in accordance with a preferred embodiment of the present invention, is to incorporate a water-swellable clay which is not peptized or polymer treated. Typical organic peptizing agents to be avoided in the composition of the present invention include ethylene maleic anhydride; polyacrylic acid; and salts of polyacrylic acid, e.g., sodium polyacrylate in order to avoid premature gelling of the water-swellable clay.

Another way to delay the complete gelling of the water-swellable clay in the slurry is to include a dispersing agent in the composition so that clay gel formation is delayed.

In accordance with another important feature of the present invention, the gelling agent incorporated into the composition for gelling the waterswellable clay is one which requires at least one hour and preferably at least two hours in order to gel the water-swellable clay in the slurry. For example, the gelling agents incorporated in accordance with the preferred embodiment of the present invention are inorganic gelling agents, such as magnesium oxide or soda ash (sodium carbonate). In this manner, the composition remains in slurry form for easy pumpability and workability into the intended location of the composition for more than one hour, and preferably at least two hours before the composition gels to a viscosity which prohibits pumping.

The water soluble silicates and multivalent metal cations useful in accordance with the present invention include those disclosed in the Crinkelmeyer et al U.S. Pat. No. 4,102,400, which patent is hereby incorporated by reference. Generally, the water soluble silicates useful in accordance with the present invention include the alkali metal silicates in both anhydrous and hydrated forms, for example, lithium, sodium and potassium silicates. Specific examples include sodium meta-silicate ($Na_2SiO_3$), hydrous sodium meta-silicate ($Na_2SiO_3.9H_2O$), sodium ortho-silicate ($Na_4SiO_4$), and corresponding lithium and potassium silicates. The water soluble silicates generally have a ratio of $SiO_2$: $Na_2O$ of 0.5:1 to 4.0:1. Particularly useful are the polysilicates having a ratio of $SiO_2$: $M_2O$ of at least 1.6 and especially in the range of 1.6:1 to 4.0:1 where M is an alkali metal, preferably sodium, lithium or potassium. The water-soluble silicates are included in the dry compositions in an amount of about 15% to 35% by weight of the dry composition and about 0.5% to 25% based on the weight of the slurry (after water addition).

The source of multivalent metal cations includes, for example, water soluble oxides, salts (e.g., acetates, halides, nitrates or sulfates) and hydroxides of multivalent metal cations. Other examples are water soluble compounds of such metals as alkaline earth metals, aluminum, copper, zinc, iron, and chromium, for example calcium chloride. Calcium compounds appear to be preferred with sodium meta-silicates and calcium chloride. Calcium acetate and cupric chloride are preferred with hydrous sodium meta-silicate. Calcium chloride is preferred with sodium ortho-silicate. The source of multivalent metal cations is included in the composition in an amount sufficient to release for reaction with the silicate, from about 30 to about 130% of the molar equivalent of the polyvalent metal cation theoretically necessary to replace the alkali metal cation of the water soluble alkali metal silicate, e.g., about 0.3–1.3 moles of multivalent cation per mole of water-soluble silicate. The reaction between the polyvalent metal cation and the silicate polymerizes the silicate and the resulting polymer is water insoluble, thereby increasing the solids content and structural strength and impermeability of the grout composition.

The polyvalent metal cations in the water supply may furnish a portion or all of the polyvalent metal cation component necessary for the reaction with the silicate compound. However, in accordance with one important embodiment of the present invention, it has been found that a pozzolanic, particulate filler, particularly a fly ash derived from lignite or sub-bituminous coal or other fly ash having a lime content of at least 10% provides the dual functions of a supply of multivalent metal cations as well as reaction within the composition to form cementitious properties for added structural strength, while maintaining flexibility. It is understood, however, that the particulate fillers useful in the compositions of the present invention need not be pozzolanic or otherwise reactive in the compositions. The particulate fillers can be completely inert and need not supply multivalent cations while providing added strength to the fully cured composition.

In accordance with one embodiment of the present invention, the filler employed in the composition is a pozzolanic material—that is, a silicious or silicious and aluminous material which in itself possesses little or no cementitious value, but will, in finely divided form and in the presence of water, chemically react with calcium hydroxide at ordinary temperatures to form compounds possessing cementitious properties. If fly ash or other pozzolanic material is used as the particulate filler, or as a portion of the particulate filler, the pozzolanic filler preferably is capable of providing sufficient multivalent metal cations for reaction with the silicate during polymerization of the silicate the an ion exchange and cross-linking reaction during silicate polymerization to form an insoluble silicate from the watersoluble silicate included in the composition.

Suitable pozzolanic particulate filler materials useful in accordance with one embodiment of the present invention include fly ash and diatomaceous earth or any other natural pozzolan, such as calcined clays, whether or not the pozzolanic material is capable of providing multivalent metal cations for reaction with the silicate.

The particulate fillers suitable in the composition of the present invention in an amount of 5% to 80% by weight of the dry grout composition can be any particulate material, particularly inert materials such as powdered silica materials, e.g. silica flour, talc, kaoin, illite, dolomite, mineral fillers including sand, rock, stone, pearlite particles, vermiculite, and other suitable inorganic particulate materials. To achieve the full advantage of the present invention, the solid particulate filler material is an essentially non water-swellable colloidal clay, particularly calcium bentonite. It has been found that the non water-swellable colloidal clays, particularly the non-swellable bentonites such as calcium bentonite prevent the grout composition from freezing and breakdown as would occur with some other solid fillers. Freezing and breakdown of the grout composition causes a substantial reduction in compression strength.

Water is added to the solid grout composition in an amount of 35% to 85% by weight of the composition, including the water, so that when the slurry is disposed in place in contact with an earthen formation to prevent water penetration from the earthen formation through the composition, the water-swellable clay will absorb the water and form a gel, substantially eliminating shrinkage from the grout composition except at the atmosphere-contacting surface of the composition. The composition after admixture with water, preferably about 20% by weight dry grout composition and 80% water, includes, where percentages are in percent by weight of the total composition: 35–85% water; 7–50% water-swellable clay, such as bentonite; 2.5–50% particulate filler; 0.1–25% water soluble silicate; 0.1–25% clay gelling agent, particularly a slow acting inorganic clay gelling agent, such as magnesium oxide or sodium carbonate; and where the multivalent metal cations are not completely provided by the water or by the filler, a source of multivalent metal cations in an amount of about 0.1 to 25% by weight.

The source of multivalent metal cations generally is provided in the slurry in an amount of about 0.3–1.3 moles of multivalent metal cation source per mole of silicate. Optionally, the slurry also includes 0.1–3% of a dispersing agent for the waterswellable clay, particularly an inorganic dispensing agent such as sodium acid pyrophosphate.

It has been found that if the slurry contains more than about 90% by weight water, the water-swellable clay will not gel and therefore will not develop the properties necessary for the cement or grout composition in accordance with the present invention. In accordance with an important feature of the present invention, the water-swellable clay absorbs the slurry water upon hydration thereby preventing the composition from shrinking upon curing. Otherwise, upon water evaporation or water lost to the surrounding formation, the composition would occupy the original solids volume, thereby substantially shrinking upon curing. The final cured structure is a gel which is resistant to erosion and is non-migratory and prevents the ingress of water into the composition.

EXAMPLE

An exemplary grout composition is prepared by mixing in a suitable mixer 66% untreated bentonite clay having a 9.47% moisture content, 1.5% sodium acid pyrophosphate, 24% calcium bentonite, 4% magnesium oxide and 4.5% hydrous sodium polysilicate (ratio of $SiO_2$: $Na_2O$ of 2.4 to 1). 2.1 pounds of this composition is added to one gallon of water to make up a slurry comprising about 20% grout solids by total weight of the slurry. The percentages of materials in the slurry are, in percent by weight of the entire slurry composition; 13.2% untreated bentonite 0.3% sodium acid pyrophosphate; 4.8% calcium bentonite; 0.8% magnesium oxide; 0.9% sodium polysilicate (ratio of $SiO_2$: $Na_2O$ of 2.4 to 1); and 80% water. The dry composition has the following chemical analysis:

|  | PERCENT |
|---|---|
| $SiO_2$ | 59.7 |
| $Al_2O_3$ | 14.5 |
| CaO | 2.23 |
| MgO | 4.92 |
| $Na_2O$ | 3.3 |
| $K_2O$ | 0.74 |
| $Fe_2O_3$ | 3.23 |
| $TiO_2$ | 0.46 |
| MnO | 0.04 |
| $P_2O_5$ | 0.96 |

The composition was found to remain a flowable slurry with a working viscosity for five hours and after 7 hours, the composition gelled to an unpumpable viscosity. 20 hours after mixing, the composition was initially cured and was gelled to a rigid state and 48 hours after mixing, the composition cured to its final state, had good structural strength yet was sufficiently moldable to deform or swell to occupy post-placement voids.

The sealing performance of the grout composition of the example was measured in comparison with three typical prior art compositions: bentonite pellets; neat Portland cement; and cement/aggregate: a composition formed from ⅓ Portland cement and ⅔ sand. To measure the sealing performances, a 12 inch seal was placed in the annulus of a plexiglass simulated well bore with casing and the annulus was subjected to a 6 foot column of head pressure. By measuring the daily loss of water, the coefficient of permeability was determined using the standard variable head calculation. The composition of the example and the three prior art compositions were tested under identical conditions to determine their sealing effectiveness. The following data shows that the sealing effectiveness of the composition of the present invention is the same as the bentonite pellets while being useful at greater depths and easier to position, and substantially more effective than neat cement or aggregate mixed cement.

|  | Coefficient of Permeability* (cm/sec.) | pH of Effluent |
|---|---|---|
| Example | $1 \times 10^{-8}$ | 9.10 |
| Bentonite Pellets | $1 \times 10^{-8}$ | — |
| Neat cement | $1 \times 10^{-7}$ | 10.44 |

-continued

| | Coefficient of Permeability* (cm/sec.) | pH of Effluent |
|---|---|---|
| Cement/aggregate | $1 \times 10^{-5}$ | 12.64 |

*Readings taken after two week equilibrium period.

It should be understood that the present disclosure has been made only by way of preferred embodiment and that numerous changes in details of construction, combination and arrangements of parts may be resorted to without departing from the spirit and scope of the invention as herein claimed.

What is claimed and sought to be secured by Letters Patent of the United States is:

1. A grout composition for admixture with water to form a gelled grout essentially impermeable to water comprising, where percentages are percent by weight of the composition before admixture with water:
   10–80% water-swellable clay;
   20–80% solid, essentially non water-swellable particulate filler;
   0.5–35% water soluble silicate;
   0.5–5% dispersing agent for the water-swellable clay; and
   0.5–35% gelling agent for the water-swellable clay wherein the dispersing agent and gelling agent combination prevents the clay from gelling after admixture of the composition with water for at least one hour.

2. The composition of claim 1 wherein the dispersing agent is sodium pyrophosphate.

3. The composition of claim 1 wherein the water-swellable clay comprises bentonite.

4. The composition of claim 1 wherein the solid particulate filler provides the source of polyvalent metal cations.

5. The composition of claim 1 wherein the solid, particulate filler is pozzolanic in the composition.

6. The composition of claim 1 wherein the filler comprises an essentially non water-swellable colloidal clay.

7. The composition of claim 6 wherein the filler comprises calcium bentonite.

8. The composition of claim 6 comprising, in weight percents:

| | PERCENT |
|---|---|
| $SiO_2$ | 59.7 |
| $Al_2O_3$ | 14.5 |
| CaO | 2.23 |
| MgO | 4.92 |
| $Na_2O$ | 3.3 |
| $K_2O$ | 0.74 |
| $Fe_2O_3$ | 3.23 |
| $TiO_2$ | 0.46 |
| MnO | 0.04 |
| $P_2O_5$ | 0.96 |

9. The composition of claim 1 wherein the water-swellable clay is a smectite clay.

10. The composition of claim 1 wherein the water-swellable clay is selected from the group consisting of bentonite, Beidellite, Nontronite, Hectorite, Saponite and Attapulgite.

11. The composition of claim 1 wherein the water-soluble silicate is an alkali metal silicate.

12. The composition of claim 11 wherein the alkali metal silicate has a ratio of $SiO_2$ to $M_2O$, where M is an alkali metal, of 0.5:1 to 4.0:1.

13. The composition of claim 11 wherein the alkali metal silicate has a ratio of $SiO_2$ to $M_2O$, where M is an alkali metal, of 1.6:1 to 4.0:1

14. The composition of claim 1 wherein the alkali metal silicate is selected from the group consisting of a lithium silicate, a sodium silicate and a potassium silicate, either in hydrated or anhydrous forms.

15. The composition of claim 14 wherein the water-soluble silicate is selected from the group consisting of sodium meta-silicate, lithium metasilicate, potassium meta-silicate, sodium ortho-silicate, lithium ortho-silicate, potassium ortho-silicate, a sodium polysilicate, a lithium polysilicate, and a potassium polysilicate.

16. The composition of claim 1 wherein the source of multivalent cations is selected from the group consisting of cupric chloride, calcium acetate and calcium chloride.

17. The composition of claim 1 wherein the source of multivalent cations is included in the composition in an amount of 0.3–1.3 moles per mole of water-soluble silicate.

18. A grout composition slurry settable to a flexible consistency after curing comprising, where percentages are percent by weight of the composition after admixture with water:
   35–85% water;
   7–50% water-swellable clay;
   2.5–50% solid, essentially non water-swellable particulate filler;
   0.1–25% water soluble silicate;
   0.1 to 3% dispersing agent for the water-swellable clay; and
   0.1–25% gelling agent for the water swellable clay wherein the dispersing agent and gelling agent combination prevents the clay from gelling after admixture of the composition with water for at least one hour.

19. The composition of claim 18 wherein the solid, particulate filler comprises an essentially non water-swellable colloidal clay.

20. The composition of claim 19 wherein the filler comprises calcium bentonite.

21. A method of protecting a structure against penetration by water comprising mixing a slurry comprising:
   35–85% water;
   7–50% water-swellable clay;
   2.5–50% essentially non water-swellable solid, particulate filler;
   0.1–25% water soluble silicate;
   0.1 to 3% dispersing agent for the water-swellable clay;
   0.1–25% gelling agent for the water swellable clay wherein the dispersing agent and gelling agent combination prevents the clay from gelling after admixture of the composition with water for at least one hour;
   and pumping the composition while in slurry form before complete gelling of the clay, to dispose the composition in contact with the structure so that the composition sets in contact with the structure substantially without shrinkage while maintaining flexibility of the composition after complete curing of the composition.

22. The method of claim 19 wherein the structure comprises a conduit disposed within a drill hole and wherein the composition in slurry form is pumped into an annular space defined between the conduit and an earthen formation formed by the drill hole, to cement the conduit into position within the drill hole while maintaining the composition flexible.

23. The method of claim 19 wherein the structure comprises a conduit disposed within an abandoned drill hole to cement the conduit in position and to prevent the conduit from collapsing.

* * * * *